A. HUTTON.
LIFT FOR HACKSAW BLADES.
APPLICATION FILED JAN. 17, 1914.
1,150,004.
Patented Aug. 10, 1915.
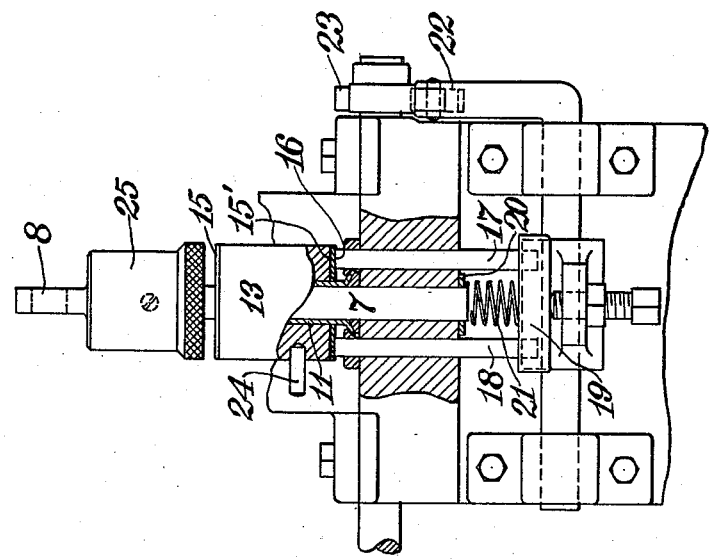
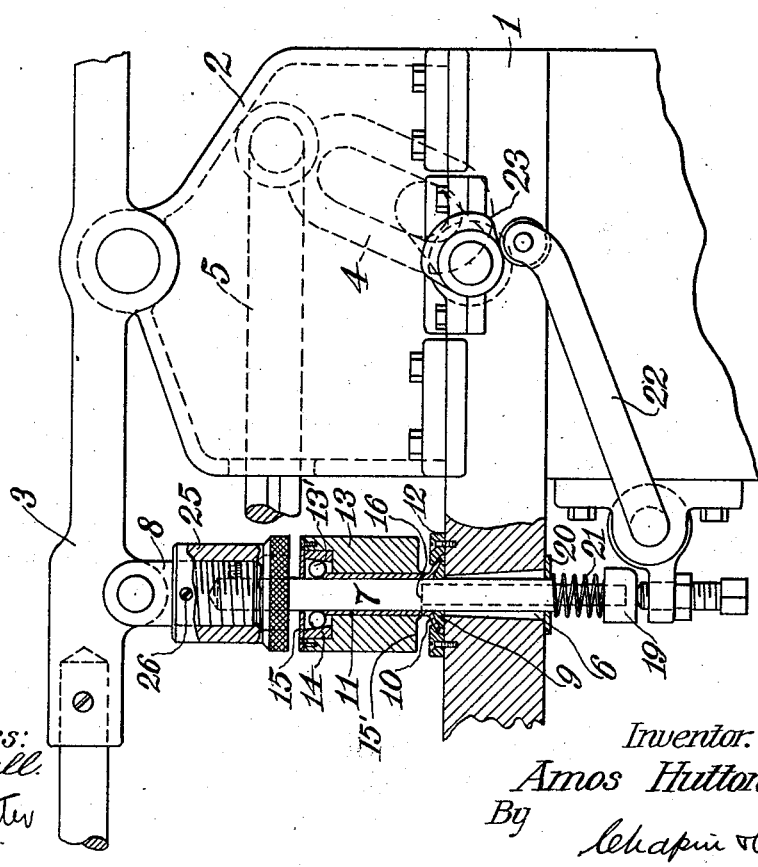
Witnesses:
F. E. Hartwell
Edith M. Potter
Inventor:
Amos Hutton.
By Chapin &c.
Attorneys

UNITED STATES PATENT OFFICE.

AMOS HUTTON, OF SPRINGFIELD, MASSACHUSETTS, ASSIGNOR TO MASSACHUSETTS SAW WORKS, OF SPRINGFIELD, MASSACHUSETTS, A CORPORATION OF MASSACHUSETTS.

LIFT FOR HACKSAW-BLADES.

1,150,004. Specification of Letters Patent. Patented Aug. 10, 1915.

Application filed January 17, 1914. Serial No. 812,727.

*To all whom it may concern:*

Be it known that I, AMOS HUTTON, a subject of the King of Great Britain, residing in Springfield, in the county of Hampden, in the State of Massachusetts, have invented certain new and useful Improvements in Lifts for Hacksaw-Blades, of which the following is a specification.

This invention relates to a hack saw machine and more particularly to a positive lifting mechanism or device to be used as a part of, or in connection with a hack saw machine.

The operation of hack saw machines can be rendered extremely more satisfactory and efficient if the hack saw is positively and uniformly lifted upon its return stroke through the work. It is to accomplish this result and moreover, to provide a mechanism which though simple and inexpensive will do this work in a uniform and efficient manner, that my invention has been developed. In connection with the device I show here for causing a positive lifting of the hack saw mechanism, I further disclose a means for gently easing the hack saw to rest after it has cut any depth required in the stock, and further a means for temporarily and instantaneously throwing off the lifting mechanism whenever the operator of the machine desires.

In the drawings which form a part of this specification, Figure 1 is an elevation, partly in section, of my invention. Fig. 2 is an end view thereof, also partly in section.

In the drawings 1 represents the bed plate or the frame work of the hack saw machine, provided with upstanding brackets 2, which carry thereupon, the counterbalanced guide bar 3, of the usual construction. The hack saw proper is operated to reciprocate upon the guide bar 3 by means of a crank and pitman 4, 5. In the bed plate of the machine is cut a tapered hole 6, as shown in Fig. 1. Through the hole 6 penetrates the lower end of the lifter bar which comprises the plunger 7, secured in a socket member 8, pivoted to the guide bar 3. Mounted upon the bed plate 1, surrounding the plunger is a convex washer 9, with which is associated the concave washer 10, preferably integral with the steel bushing 11 fastened to the plunger 7. The removable collar 12 keeps these members in position. The object of this mounting is to allow for the necessary tilting of the hack saw during the operation of the machine.

Slidable upon the bushing 11 is the cylindrical member 13 in which I have shown a conical bushing 14 at its upper end, secured therein by the cover plate 15. The conical bushing 14 is seated in a cylindrical recess such as shown. A series of steel balls 13′ are located in the conical recess in member 13. The bottom of the cylindrical member 13 has thereupon alternate high and low portions such as indicated by the numerals 15′ and 16. The portion 16 consists of a strip, slightly greater in width than the rod 7, which extends diametrically across the circular base portion of the member 13. On both sides of the portion 16 are cut away portions 15′, segmental in shape, which are connected to the portion 16 by inclines. Slidably mounted in the bed plate 1, on opposite sides and adjacent the hole 6, are rods 17 and 18, the upper ends of which are adapted to bear, when in the position shown in Fig. 1, upon the portion 16. The lower ends of these rods are seated in an adjustable carrier 19, between which and the washer 20, surrounding the lower end of the plunger 7 rests the compression spring 21. The carrier 19 is given periodic vertical movements by means of the crank 22, and a cam 23 upon the main shaft of the machine as is clearly discernible from the drawings.

Secured in the cylindrical member 13 is a pin 24. The rod 24 may be turned by hand as the structure illustrated in the drawing is arranged for hand operation.

Threaded upon the socket member 8 is a stop cylinder 25 which may be adjusted in any position and thereafter held there by a screw 26.

The operation of the machine is as follows: Periodic vertical reciprocations are communicated to the rods 17 and 18 by the cam 23 as will be obvious from the drawing. In the normal position of the parts cylinder 13 is so held that the portions 16 thereof, rest upon the rods 17 and 18, as clearly shown in dotted lines in Fig. 1 and in full lines in Fig. 2. In this position the relative positions of the cylinder 13 and the bushing 11 is such that the balls 13′ bear on one side against the bushing 14 and upon the other against the naked shank 7. In this position of the parts it will be obvious that the motion of the rods 17 and 18 connected to the cylinder 13 will cause the balls 13' to clutch the bar 7 upon which upward movement of the cylinder 13 carrying the bar 7 therewith will take place, without lost motion, but allowing cylinder 13 to drop back, as the rods 17 and 18 go down, independently of the bar 7. This will insure a positive lifting of the hack saw upon each return stroke. Now, however, should it be desired to throw off this clutch mechanism for any reason, the operator merely turns the pin 24 through an angle of 90 degrees by hand or any other suitable means, whereupon cylinder 13 is rotated and lowered upon bushing 11, so that the portions 15' come to bear upon rods 17 and 18. In this position of the parts it is obvious that the balls 13' will rest between the bushing 11 on one hand and the washer 14 on the other, and that in this position the cylinder 13 may be reciprocated by the rods 17 and 18 without clutching the shank 7.

As is common in devices of this character, the guide bar 3 is fed downward by gravity as the saw eats its way through the stock. I have provided adjustable stop cylinder 25 for the purpose of determining the depth of the cut to be made in any stock. By adjusting the stop cylinder 25 it will come to bear upon the cover plate 15 at any time desired, thereby automatically preventing the saw from further biting into the work. When the stop cylinder 25 has once thus come to rest on the work stroke of the saw, the saw will simply play back and forth in its cut without eating the stock.

Having now particularly pointed out and specifically described my invention but wishing it clearly understood that many departures and variations may be made from the precise form thereof without departing from the scope of the invention which is more truly bounded and defined by the claims hereto appended, I claim:

1. In a hack saw machine, a support for the saw, means to reciprocate the saw on said support, means including a pair of vertically movable rods for raising the saw during a portion of its reciprocation, and means including a movable cylindrical member whereby said last named means may be rendered inoperative at will.

2. In a hack saw machine, a vertically movable support for the saw in combination with means for periodically raising said saw and adjustable means including a stop cylinder for limiting its movement in one direction.

3. In a hack saw machine, a guide bar, means for positively periodically raising said guide bar, said means including a clutch, and means including a slidable and rotatable cylindrical member whereby said clutch may be rendered inoperative at will.

4. In a hack saw machine, a lift plunger, a bushing thereon, a cylinder having slidable on said bushing and formed with a recess in its upper end, a conical bushing in the recess, balls carried in said conical bushing, and means to reciprocate the cylinder, all for the purpose described.

5. In a hack saw machine, a lift plunger, a bushing thereon, a cylinder having a conical surface slidable on said bushing, balls carried on said conical surface, and means to reciprocate the cylinder, said balls acting to clutch said cylinder to said plunger upon movement in one direction, together with means whereby the clutch described may be rendered inoperative at will.

6. In a hack saw machine comprising a gravity fed lifter plunger, a clutch cylinder and a stop cylinder on said plunger together with means for adjusting one of said cylinders on said plunger with relation to the other.

7. In a hack saw machine and in combination a guide bar, a lift plunger, a clutch associated with said lift plunger and comprising a cylinder slidable on said plunger, stepped portions on said cylinder, rods supporting said cylinder, means to reciprocate the rods and means whereby the said rods may be brought to bear on said cylinder at different stepped portions thereof.

8. In a hack saw machine and in combination, a guide bar, a gravity fed lifting bar, a stop cylinder on said lift bar, a rest for said stop cylinder, said cylinder being adjustable with relation to said rest.

AMOS HUTTON.

Witnesses:
 LYMAN LEE,
 A. MAY DANCKET,
 G. W. DONAHUE.

Copies of this patent may be obtained for five cents each, by addressing the "Commissioner of Patents, Washington, D. C."